US010356130B2

(12) United States Patent
HP et al.

(10) Patent No.: US 10,356,130 B2
(45) Date of Patent: Jul. 16, 2019

(54) COMPUTER TELEPHONY INTEGRATION (CTI) CONTROL OF MULTIPLE DEVICES WITH A SINGLE ADDRESS OF RECORD

(71) Applicant: Avaya Inc., Santa Clara, CA (US)

(72) Inventors: Ananda HP, Pune (IN); Amit Bijwe, Pune (IN); Joel Ezell, Broomfield, CO (US); Gordon Brunson, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 112 days.

(21) Appl. No.: 15/605,517

(22) Filed: May 25, 2017

(65) Prior Publication Data
US 2018/0343289 A1    Nov. 29, 2018

(51) Int. Cl.
*H04L 29/06* (2006.01)
(52) U.S. Cl.
CPC ...... *H04L 65/1006* (2013.01); *H04L 65/1063* (2013.01); *H04L 65/1069* (2013.01); *H04L 65/1073* (2013.01)
(58) Field of Classification Search
CPC ............... H04L 51/24; H04L 29/06027; H04L 65/4007; H04M 3/42161
See application file for complete search history.

(56) References Cited

U.S. PATENT DOCUMENTS 9,054,909 B2 * 6/2015 Shtiegman ........ H04L 29/06027
2014/0029478 A1 * 1/2014 Bhagavatula ....... H04L 65/1053
370/271

* cited by examiner

*Primary Examiner* — Ayaz R Sheikh
*Assistant Examiner* — Debebe A Asefa
(74) *Attorney, Agent, or Firm* — Sheridan Ross P.C.

(57) ABSTRACT

In order to deal with multiple communication endpoints that use a single address of record (e.g., a telephone number), a list of friendly names is determined for the multiple communication endpoints. The friendly names identify individual communication endpoints. For example, a friendly name may be "Joe's Desktop." When a Computer Telephone Integration (CTI) application is associated with a communication session, the list of friendly names is presented to a user. The user selects one of the friendly names. This results in a message being sent that indicates a communication endpoint associated with the selected friendly name. The message with the friendly name causes a new communication session to be automatically initiated from a communication endpoint associated with the selected friendly name or an answer of a forked communication session with the communication endpoint associated with the selected friendly name.

20 Claims, 5 Drawing Sheets

COMPUTER TELEPHONY INTEGRATION (CTI) CONTROL OF MULTIPLE DEVICES WITH A SINGLE ADDRESS OF RECORD

BACKGROUND

Computer Telephone Integration (CTI) allows call control by a third party. CTI is widely used in Unified Communication Applications and the Contact Center domain. The benefit of such technology is widely known. CTI allows any authorized application to control a separate device for the purposes of making calls or controlling existing calls.

One common use of CTI is to enable "click to call" from a web page or other application—allowing a user to easily dial somebody from their contact list or from a company directory. Often a lookup is done on a user's Personal Computer (PC) with the call then being launched form a user's desktop phone. Another example is where a CTI application is used to answer an incoming call.

A problem arises, however, when a user has multiple devices/soft clients registered to a single address of record (e.g., a single telephone number). Telephone numbers have traditionally been the only identifier used by CTI Application Programming Interfaces (APIs) to identify a device. Current CTI applications make an assumption that a single device is associated with a phone number. This assumption causes problems with current communication solutions. Users often have a desk phone, a mobile phone, and soft clients on multiple devices such as laptops and tablets. These clients are registered under a single address of record. When a call is received using a telephone number associated with multiple communication endpoints, all of the communication endpoints receive the same call. In addition, any of the clients can initiate a call using the same telephone number/address of record.

The current solution of having multiple devices associated with a telephone number/address is incompatible with existing CTI applications that only work with a single telephone number.

SUMMARY

These and other needs are addressed by the various embodiments and configurations of the present disclosure. In order to deal with multiple communication endpoints that use a single address of record (e.g., a telephone number), a list of friendly names is determined for the multiple communication endpoints. The friendly names identify individual communication endpoints. For example, a friendly name may be "Joe's Desktop." When a Computer Telephone Integration (CTI) application is associated with a communication session, the list of friendly names is presented to a user. The user selects one of the friendly names. This results in a message being sent that indicates a communication endpoint associated with the selected friendly name. The message with the friendly name causes a new communication session to be automatically initiated from a communication endpoint associated with the selected friendly name or an answer of a forked communication session with the communication endpoint associated with the selected friendly name.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
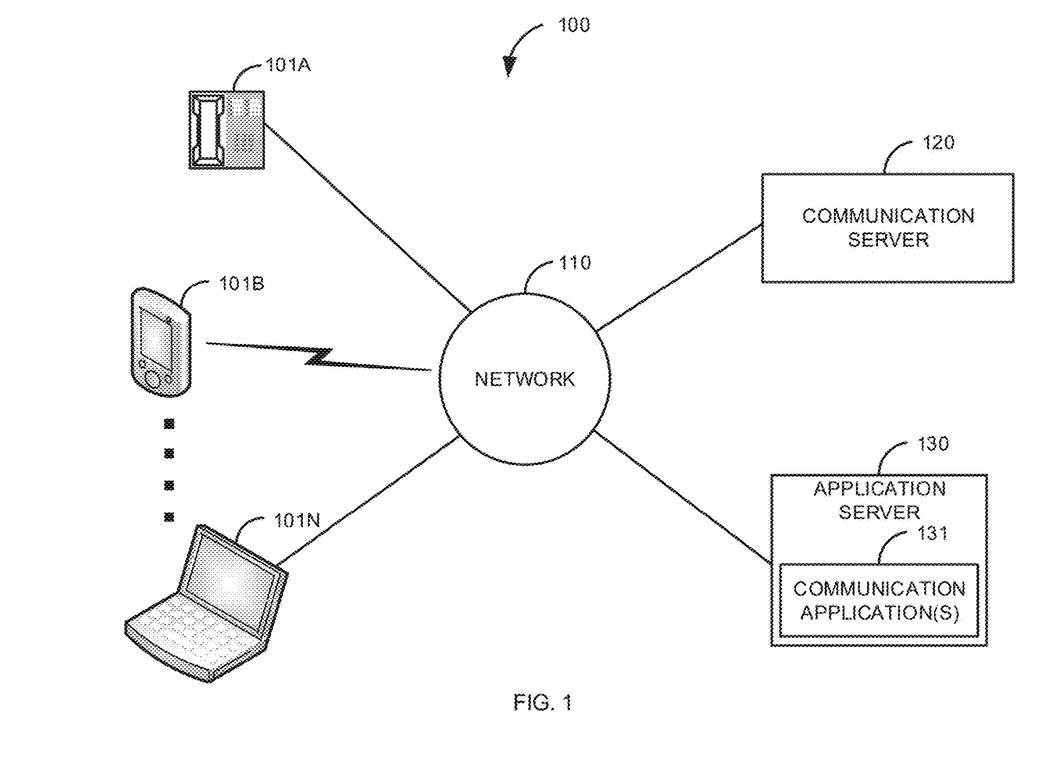
FIG. 1 is a block diagram of a first illustrative system for Computer Telephony Integration (CTI) control of multiple communication endpoints that use a single address of record.

FIG. 1 is a block diagram of a first illustrative system 100 for Computer Telephony Integration (CTI) control of multiple communication endpoints 101 that use a single address of record. The first illustrative system 100 comprises communication endpoints 101A-101N, a network 110, a communication server 120, and an application server 130.

The communication endpoints 101A-101N can be or may include any user communication endpoint device that can communicate on the network 110, such as a Personal Computer (PC), a telephone, a cellular telephone, a Personal Digital Assistant (PDA), a tablet device, a notebook device, a smart phone, and/or the like. The communication endpoints 101A-101N are devices where a communication sessions ends. For example, one or more of the communication endpoints 101A-101N may comprises a soft phone or a mobile device. The communication endpoints 101A-101N are not network elements that facilitate and/or relay a communication session in the network, such as the communication server 120, a router, a switch, and/or the like. As shown in FIG. 1, any number of communication devices 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The communication server 120 can be or may include any hardware system that can facilitate communications on the network 110, such as a session manager, a communication manager, a proxy server, a Private Branch Exchange (PBX), a central office switch, a router, and/or the like.

The application server 130 can be or may include any hardware system that can host communication applications 131, such as a web server, a media server, a communication server 120, a voice mail system, a voice recording server, a conferencing server, and/or the like. In one embodiment, the application server 130 may be part of the communication server 120.

The communication application(s) 131 can be any application that is used to manage communication sessions, such as a recording application, a calendar application, a call initiation application, a telephony application, a video application, an Instant Messaging application, an email application, a call screening application, a conferencing application, and/or the like. The communication application(s) 131 communicate with the communication server 120 via an Application Programming Interface (API). For example, the API may be a Telephony Services Application Programming Interface (TSAPI), an Extended Markup Language (XML) interface, a Java Speech API (JSAPI) application, a remote telecommunications application, and/or the like. The communication application 131 allows a third party communication application 131 to control a communication session in various ways.

In FIG. 1, there may be multiple communication applications 131 on the application server 130. For example, the communication server 130 may be a multi-threaded operating system that supports different types of communication applications 131. If there are multiple communication applications 131, each of the processes described herein can be used for each of the multiple communication applications 131.

Figure 2:
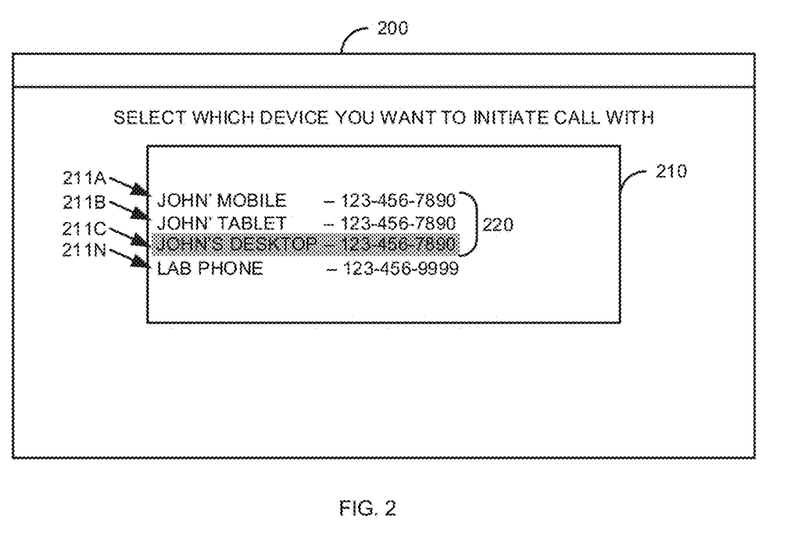
FIG. 2 is a diagram of a computer display where a list of friendly names are presented to a user for selection.
Figure 3:
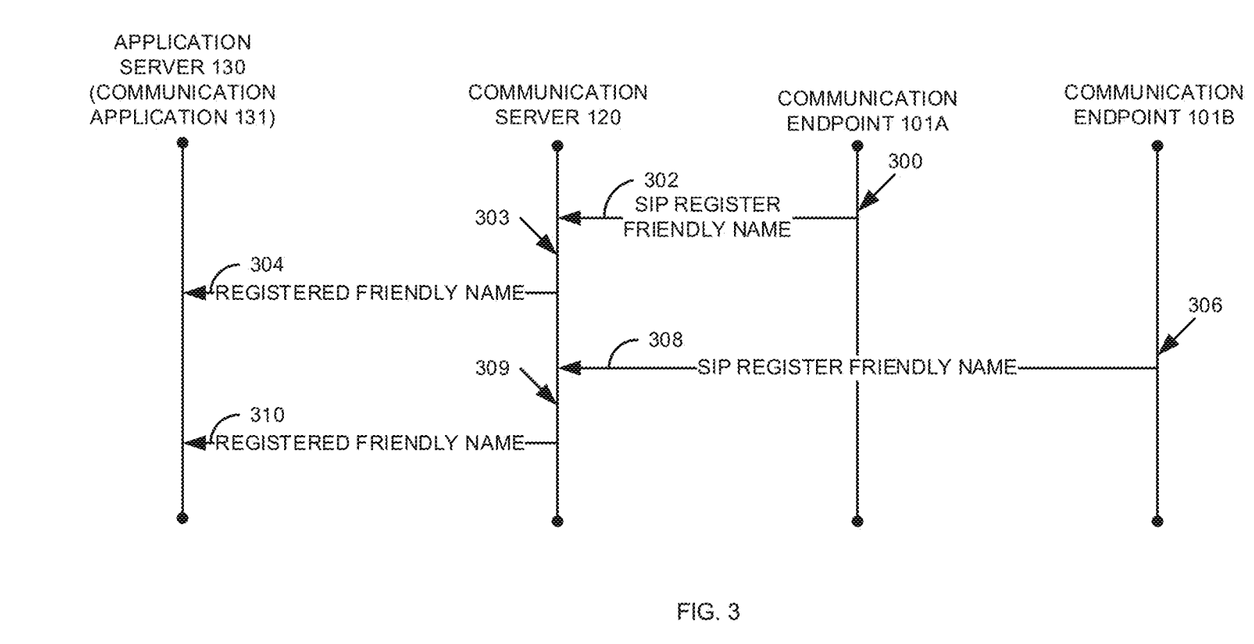
FIG. 3 is a flow diagram of communication endpoints registering a friendly name.

FIG. 2 is a diagram of a computer display where a list of friendly names 210 are presented to a user for selection. The display is shown as a computer generated window 200 that contains the list of friendly names 210. The list of friendly names 210 comprises two or more friendly names. In FIG. 2, the list of friendly names 210 comprises two groups of friendly names 211 associated with an address of record. An address of record is an address that is used to tie a communication endpoint 101 to a user/entity for a communication session, such as a telephone number, a SIP Uniform Resource Identifier (URI) (e.g., bob@companyxyz.com), or the like. The two groups of friendly names 211 are: 1) friendly names 211A-211C associated with the address of record 123-456-7890 220 and 2) the friendly name 211N associated with the address of record 123-456-9999. In FIG. 3, the list of friendly names 210 may only comprise a single group 220 of friendly names 211 associated with a single address of record. For example, the list of friendly names 210 may only comprise the friendly names 211A-211C.

A friendly name 211 is a name that a user associates with a particular communication endpoint 101 (e.g., a softphone in communication endpoint 101N, a mobile communication device, a desktop phone, etc.). A friendly name 211 may be associated with a communication endpoint 101 in various ways. For example the user may associate a friendly name 211 based on input from a graphical user interface on a communication endpoint 101, via a default name, via an administration terminal (not shown), and/or the like.

The list of friendly names 210 is where a user has associated a friendly name 211 with a particular communication endpoint 101. For example, in FIG. 2, four friendly names 211A-211N are displayed in the list of friendly names 210: 1) John's mobile, 2) John's tablet, 3) John's desktop, and 4) a lab phone. Each of the friendly names 211A-211N has an associated communication endpoint 101. For example, the friendly name 211A (John's mobile) may be communication endpoint 101B, the friendly name 211B (John's tablet) may be communication endpoint 101N, the friendly name 211C (John's desktop) may be communication endpoint 101A, and the friendly name 211N (lab phone) may be a different communication endpoint 101.

In FIG. 2, a user has selected the friendly name 211C (John's Desktop). The user may select the friendly name 211C in various ways, such as using a cursor, via a voice command, via a touch screen, and/or the like. The selection is shown where the friendly name 211C is highlighted. The selection of a friendly name 211 allows a user to select an individual communication endpoint 101 that is associated with the friendly name 211 for control by the communication application 131.

In one embodiment, the presented list of friendly names 210 may be a subset of the list of friendly names 210. For example, the presented list of friendly names 210 may be displayed based on a type of communication session. For example, if the type of communication is a video communication session, then only friendly names 211 associated with communication endpoints 101 that support video may be displayed. If the type of communication session is an Instant Messaging (IM) communication session, then only communication endpoints 101 that can support IM communications are displayed.

Figure 4:
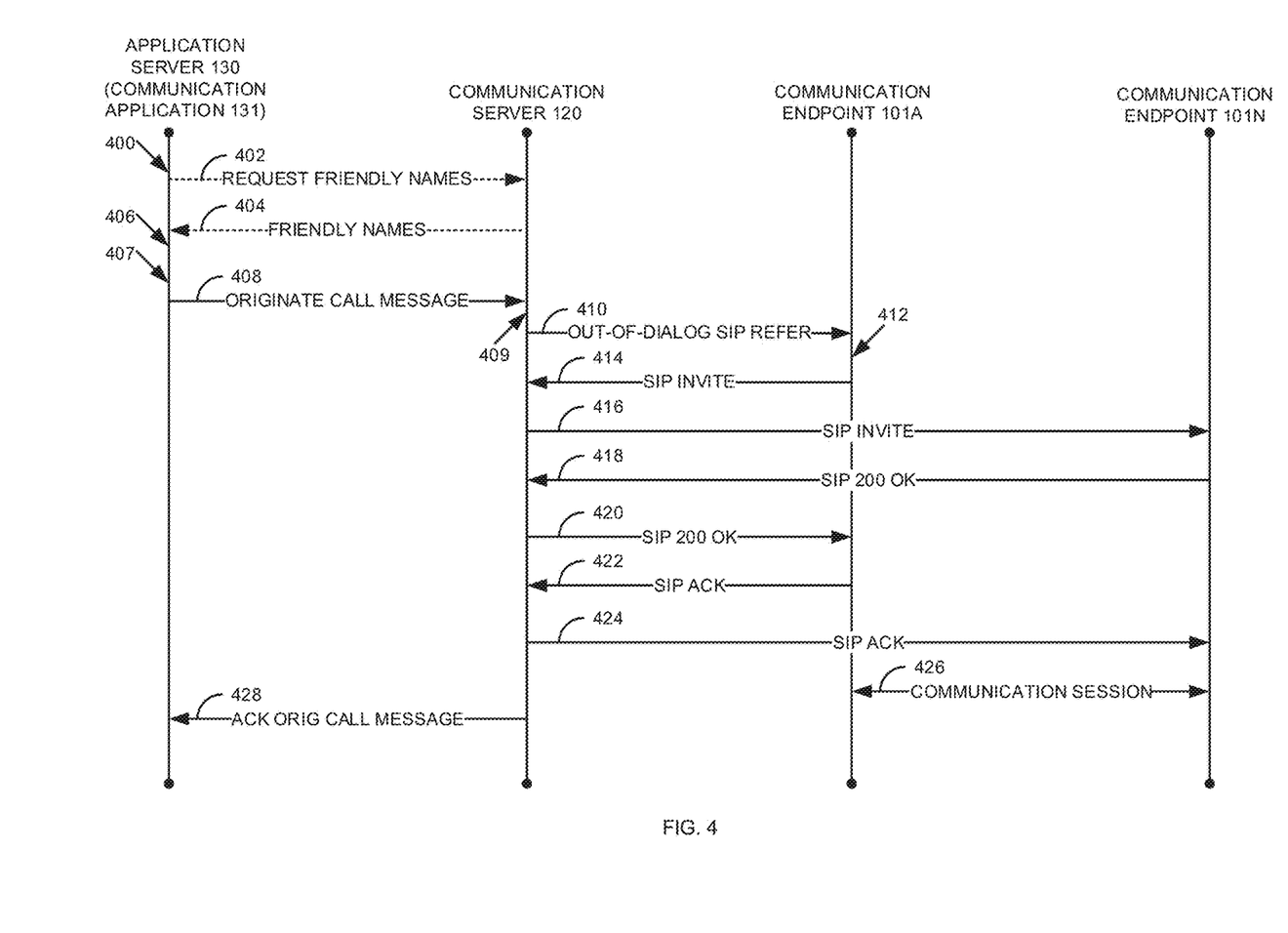
FIG. 4 is a flow diagram of a process for originating a communication session from an individual communication endpoint of a plurality of communication endpoints that use a single address of record.
Figure 5:
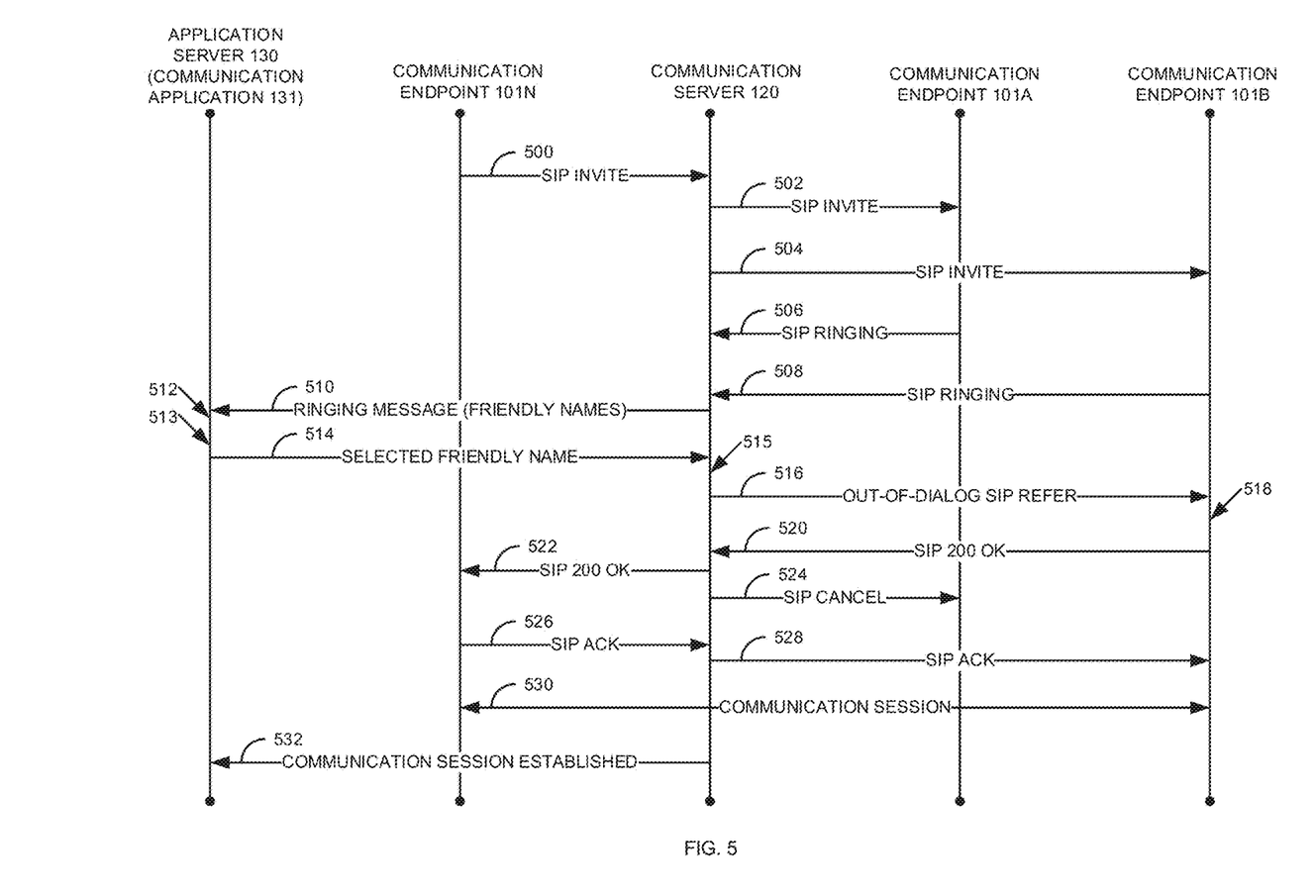
FIG. 5 is a flow diagram of a process for receiving a communication at an individual communication endpoint of a plurality of communication endpoints that use a single address of record.

FIG. 3 is a flow diagram of communication endpoints 101A-101B registering a friendly name 211. Illustratively, the communication endpoints 101A-101N, the communication server 120, the application server 130, and the communication application(s) 131 are stored-program-controlled entities, such as a computer or microprocessor, which performs the method of FIGS. 3-5 and the processes described herein by executing program instructions stored in a computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The description of FIGS. 3-5 describes the communication between the communication endpoints 101A-101N and the communication server 120 using Session Initiation Protocol (SIP) messaging. SIP is a standard protocol that is well known in the field of telecommunications. FIGS. 3-5 discloses the use of various standard SIP messages (e.g., a SIP INVITE message, a SIP REGISTER message, etc.), which are defined in Network Working Group RFC 3261 "SIP: Session Initiation Protocol" June, 2002, which is incorporated herein in its entirety by reference. However, in other embodiments, other types of protocols may be used between the communication endpoints 101A-101N and the communication server 120, such as, H.323, Web Real-Time Communication (WebRTC) protocol, video protocols, and/or the like.

In FIG. 3-5, the communication between the communication server 120 and the application server 130/communication application 131 is described using generic messages that may be implemented using various messaging protocols, such as, a Telephony Services Application Programming Interface (TSAPI), an Extended Markup Language (XML) communication protocol, a Java Telephone API (JTAPI) protocol, a Hyper Text Transport Protocol (HTTP), a Representational State Transfer (REST), a custom protocol, and/or the like. Regardless of the actual protocols used in FIGS. 3-5, one of ordinary skill in the art will be able to implement the processes of FIGS. 3-5 using different protocols than those described herein.

The process of FIG. 3 starts in step 300 when a user of the communication endpoint 101A enters a friendly name 211 on the communication endpoint 101A. For example, the user may use a mouse, a touch screen, a keypad, a voice interface, and/or the like on the communication endpoint 101A to enter a friendly name 211. In one embodiment, the user enters the friendly name 211 after authenticating on the communication endpoint 101A. In response to the user entering the friendly name 211, in step 300, the communication endpoint 101A sends, in step 302, a SIP REGISTER message that contains the friendly name 211. In one embodiment, the friendly name 211 sent in the SIP REGISTER message of step 302 is sent in a SIP Contact header, which is a defined SIP header. Alternatively, the friendly name 211 may be sent in other SIP headers or in a proprietary header.

The communication server 120 receives the SIP REGISTER message of step 302. The communication server 120 has previously defined which communication endpoints 101 have been associated with an address of record. For example, as shown in FIG. 2, the address of record (telephone number) 123-456-7890 has three communication endpoints 101 that are associated with the address of record 123-456-7890. The communication server 120 maps, in step 303, the friendly name 211 received in step 302 to the specific communication endpoint 101 that sent the friendly name in step 302.

The communication server 120 sends, in step 304, a registered message to the application server 130/communication application 131 that contains the friendly name 211 entered in step 300. In addition, the registered message of step 304 may include a device identifier that is unique (e.g., a Globally Routable Uniform Resource Identifier). For example, the message of step 304 may comprise the friendly name "John's desktop" (211C as shown in FIG. 2). In addition, the message of step 304 may also comprise the address of record (123-456-7890) so that the communication application 131 can determine which friendly names 211 are associated with which addresses of record in the list of friendly names 210.

The register friendly name message of step 304 may be implemented, for example, using TSAPI. A user at the communication endpoint 101B enters a friendly name 211 at the communication endpoint 101B in step 306. In response to the user entering the friendly name 211, in step 306, the communication endpoint 101B sends, in step 308, a SIP REGISTER message that contains the friendly name 211. In one embodiment, the friendly name 211 sent in the SIP REGISTER message of step 308 is sent in a SIP Contact header, which is a defined SIP header. Alternatively, the friendly name 211 may be sent in other SIP headers or in a proprietary header.

The communication server 120 receives the SIP REGISTER message of step 308. The communication server 120 maps, in step 309, the friendly name 211 received in step 308 to the specific communication endpoint 101. The communication server 120 sends, in step 310, a registered message to the application server 130/communication application 131 that contains the friendly name 211 entered in step 306. In addition, the registered message of step 310 may include a device identifier that is unique (e.g., a Globally Routable Uniform Resource Identifier). The message of step 310 may also contain the associated address of record. At this point, the communication application 131 has the list of friendly names 210 along with the address of record associated with the list of friendly names 210.

FIG. 3 only shows the registration of two communication endpoints 101A-101B. However, additional communication endpoints 101 may register their friendly names 211 in a similar manner. For example communication endpoint 101N may register its friendly name using a similar process.

In one embodiment, a communication endpoint 101 may send multiple SIP REGISTER message that associates two communication endpoints 101 with different address of record. For example, as shown in FIG. 2, the user may associate the friendly name 211N "Lab Phone" so that the friendly name 211N "Lab Phone" may be shown in the list of friendly names 210. This allows the user to be able to select a different communication endpoint 101 other than those associated with the user's address of record to be used by the communication application 131.

FIG. 4 is a flow diagram of a process for originating a communication session from an individual communication endpoint 101 of a plurality of communication endpoints 101 that use a single address of record. The process starts in step 400 when a captured event causes the communication application 131 to have a need to initiate a communication session. The captured event may be detected by the communication application 131 or detected external to the communication application 131. The captured event may occur based on different criteria. For example, the captured event may be where a conference call is scheduled in a user's calendar, the captured event may be based on an event in a contact center (e.g., a scheduled callback), the event may be a call transfer event that transfers a call using the user's address of record, and/or the like. Alternatively, the captured event may be where a user initiates a click to call operation from a web application or other application.

The application server 130/communication application 131 sends, in step 402, a request to the communication server 120 to get the list of friendly names 210. The communication server 120 responds, in step 404, by sending the list of friendly names 210. The list of friendly names 210 may also include the associated address of record. In FIG. 4, steps 402 and 404 are shown using dashed lines. This indicates that steps 402 and 404 may be optional. For example, the communication application 131 may already have received the list of friendly names 210 as described in FIG. 3, steps 304 and 310. If the communication application 131 already has the list of friendly names 210, then steps 402 and 404 need not occur.

After getting the list of friendly names 210 (from either step 404 or steps 304/310), the communication application 131 presents the list of friendly names 210 to the user in step 406 (e.g., as shown in FIG. 2). For example, the communication application 131 may be a web server that generates for presentation the list of friendly names 210 via a web page. The user then selects one of the friendly names 211 in step 407. For example, as shown in FIG. 2, the user may select the friendly name 211C (John's Desktop).

After the friendly name 211 is selected by the user in step 407, the application server 130/communication application 131 sends, in step 408, an originate call message to the communication server 120. The originate call message of step 408 includes the selected friendly name 211. Alternatively the originate call message of step 408 may include a unique device identifier. The originate call message of step 408 also includes the address of record and/or a unique device identifier for the communication endpoint 101 that is going to initiate the communication session. For example, if the user selected the friendly name 211C (John's Desktop) in step 407, the originate call message of step 408 will include the friendly name 211C along with the address of record 123-456-7890 and the SIP Contact Address for the device. In addition, the originate call message of step 408 will include the address of record of the communication endpoints 101 that are to be called. For example, the originate call message of step 408 may include the friendly name 211C (John's Desktop), the telephone number 123-456-7890 (originator of the call), and the telephone number 123-456-8888 (recipient of the call).

The communication server 120 receives the originate call message of step 408. The communication server 120, based on the friendly name 211/address of record, looks up the communication endpoint 101 associated with the friendly name 211/address of record (e.g., as discussed in step 303) in step 409. In this example, the communication endpoint 101 that is associated with the friendly name 211C (John's Desktop) is communication endpoint 101A. The communication server 120 also looks up the communication endpoint 101 associated with the address of record 123-456-8888 (for the recipient of the call) in step 409. In this example, the communication endpoint 101N is associated with the address of record 123-456-8888.

In one embodiment, the originate call message of step 408 may use only the friendly names 211. In this example, the communication server 120 will look up the associated addresses of records to originate the call in step 409.

The communication server 120 sends an out-of-dialog SIP REFER message in step 410 to the communication endpoint 101A. The communication endpoint 101A is identified in the SIP Request URI field in the out-of-dialog SIP REFER message of step 410. The address of the communication endpoint 101N is in a SIP Refer-to header in the out-of-dialog SIP REFER message of step 410. The SIP Request URI field and the SIP Refer-to header are standard defined SIP headers/fields.

The communication endpoint 101A receives the out-of-dialog SIP REFER message of step 410. In response to receiving the out-of-dialog SIP REFER message of step 410, the communication endpoint 101A automatically goes off hook (e.g., goes on speaker phone) in step 412 and automatically dials the communication endpoint 101N. As a result, the communication endpoint 101A sends a SIP INVITE message to the communication server 120 in step 414. The SIP Request URI field in the SIP INVITE message of step 414 has the communication address (e.g., an IP address) of the communication endpoint 101N. The communication server 120 sends the SIP INVITE message of step 414 to the communication endpoint 101N in step 416.

The communication endpoint 101N sends, in step 418, a SIP 200 OK message to the communication server 120. The communication server 120 sends the SIP 200 OK message of step 418 to the communication endpoint 101A in step 420. The communication endpoint 101A sends, in step 422, a SIP ACK message to the communication server 120. The communication server 120 sends the SIP ACK message of step 422 to the communication endpoint 101N in step 424.

At this point a communication session may be established in step 426. For example, a voice communication session may be established between the communication endpoint 101A and 101N using Real-Time-Protocol (RTP) protocol. The communication server 120 sends, in step 428, an acknowledgement message that indicates to the communication application 131 that the communication session between the communication endpoints 101A and 101N has been established.

To illustrate, consider the following example. The user John is associated with the address of record 123-456-7890 and has a conference call scheduled in John's calendar at 1:00 PM. The call is with Sally whose telephone number is 123-456-8888. At 1:00, the calendaring application 131 pops up a window asking if John want to start the conference call with Sally. John approves the start of the conference call. For example, by clicking on an approve button.

In response, the calendaring application 131 sends the request to get the list of friendly names 210 in step 402. The communication server 120 sends, in step 404, the list of friendly names 210. The calendaring application 131 displays the list of friendly names 210 to John in step 406. John selects the friendly name 211C (John's Desktop) in step 407. The calendaring application 131 sends the originate call message, in step 408, which has the friendly name/address of record for John and the address of record for Sally's communication endpoint 101N. The communication server 120 matches the selected friendly name 211C (John's Desktop)/address of record 123-456-7890 to the communication endpoint 101A in step 409. The communication server 120 also matches the address of record 123-456-8888 to the communication endpoint 101N (Sally's communication endpoint 101N) in step 409. The communication server 120 sends the out-of-dialog SIP REFER message, in step 410, to the communication endpoint 101A. The communication endpoint 101A goes off hook and automatically dials the communication endpoint 101N (Sally's communication endpoint 101N), which results in the SIP INVITE messages of steps 414/416 being sent. The communication endpoint 101N sends the SIP 200 OK message in step 418, which is forwarded in step 420 to the communication endpoint 101A. The communication endpoint 101A sends the SIP ACK message of step 422, which is forwarded, in step 424, to the communication endpoint 101N. A voice call is then established between John and Sally in step 426 using RTC protocol. The communication server 120 sends the ACK message of step 428 to the calendar application in step 428 indicating that the call between John and Sally has been established. The calendar application can then place an update in the calendar application that the call between John and Sally actually took place.

FIG. 5 is a flow diagram of a process for receiving a communication at an individual communication endpoint 101 of a plurality of communication endpoints 101 that use a single address of record. The process starts in step 500 when the communication endpoint 101N sends a SIP INVITE message to the communication server 120. The SIP INVITE message of step 500 is directed towards the address of record 123-456-7890. The communication server 120 looks up the address of record (123-456-7890) and determines that there are two communication endpoints 101A and 101B associated with the address of record 123-456-7890. As a result, the SIP INVITE message of step 500 is forked to the communication endpoints 101A and 101B respectively in steps 502 and 504. Although FIG. 5 only discusses forking to the SIP INVITE message of step 500 to two communication endpoints 101A-101B, additional communication endpoints 101 may receive the SIP INVITE message of step 500 if they are associated with the same address of record.

The communication endpoints 101A and 101B respond by sending SIP RINGING messages in steps 506 and 508. The communication server 120 send a ringing message (an alerting message) to the communication application 131 indicating that the communication endpoints 101A and 101B are ringing in step 510. In one embodiment, two ringing (alerting messages) that correspond to the two SIP RINGING messages of step 506 and 508 may be sent in step 510. The ringing message of step 510 includes the list of friendly names 210 and/or a unique device identifier. The list of friendly names 210 may also include the associated address of record. As a result of receiving the ringing message of step 510, the communication application 131 displays the list of friendly names 210 to the user in step 512. The list of friendly names 210 is presented to the user includes friendly names 211 associated with the communication endpoints 101A and 101B (the ones that are ringing). The user selects the friendly name 211 for communication endpoint 101B in step 513.

The application server 130/communication application 131 sends, in step 514, the selected friendly name 211 to the communication server 120. As a result of receiving the selected friendly name 211 in step 514, the communication server 120 determines that the communication endpoint 101B is associated with the selected friendly name 211 in step 515. The communication server 120 sends an out-of-dialog SIP REFER message, in step 516, to the communication endpoint 101B (the selected communication endpoint 101B), instructing the communication endpoint 101B to answer the communication session. As a result of receiving the out-of-dialog SIP REFER message of step 516, the communication endpoint 101B automatically answers the communication session (goes off hook to speaker phone) in step 518.

The communication endpoint 101B sends a SIP 200 OK message to the communication server 120 in step 520. The communication server 120 sends the SIP 200 OK message of step 520 to the communication endpoint 101N in step 522. The communication server 120 sends a SIP CANCEL message, in step 524, to the communication endpoint 101A to cancel the SIP INVITE message sent in step 502. The communication endpoint 101N sends a SIP ACK message to the communication server 120 in step 526. The SIP ACK message of step 526 is sent by the communication server 120 to the communication endpoint 101B in step 528.

At this point a communication session is established between the communication endpoint 101N and the communication endpoint 101B in step 530 (e.g., by using RTC protocol). The communication server 120 sends a communication established message to the application server 130/communication application 131 in step 532.

To illustrate, consider the following example. The communication application 131 is a web application that allows a call to be initiated to the user from a contact center. The user enters their telephone number (address of record) and then clicks a button to initiate the call. As a result, the SIP INVITE message of step 500 is initiated from an agent's communication endpoint 101N. Alternatively, the SIP INVITE message of step 500 may originate from the communication application 131 (e.g., in a contact center). In another embodiment, a call may initiated to a contact center using a 1-800 number that is routed to a contact center agent. This results in the SIP INVITE message of step 500 being routed to a contact center agent's address of record.

The SIP INVITE message of step 500 is then sent to the two communication endpoints 101A-101B associated with the telephone number in steps 502/504 The two communication endpoints 101A-101B respond with the SIP RINGING messages of steps 506/508. The communication server 120 sends the ringing message of step 510 with the friendly names 211 of the communication endpoints 101A-101B. The web application 131 displays the list of friendly names 210 to the user in step 512. The user selects the friendly name 211 of the communication endpoint 101B in step 513. The web application 131 sends the selected friendly name 211 to the communication server 120 in step 514.

The communication server 120 determines that the communication endpoint 101B is associated with the selected friendly name 211 in step 515. The communication server 120 sends the out-of-dialog SIP REFER message in step 516 to the communication endpoint 101B. This causes the communication endpoint 101B to automatically go off hook and answer the communication session in step 518. The communication endpoint 101B sends the SIP 200 OK message in step 520, which is then sent to the communication endpoint 101N in step 522. The communication server 120 sends the SIP CANCEL message, in step 524, to the communication endpoint 101A. The communication endpoint 101N sends the SIP ACK message of step 526, which is then sent to the communication endpoint 101B in step 528. This results in a voice call being established in step 530. The indication that the communication has been established is sent to the web application 131 in step 532.

In one embodiment, the message of step 510 may be sent based on receiving the SIP INVITE message of step 500. In this case, the SIP INVITE message of step 504 would be sent after step 515. The SIP INVITE message (step 502), the SIP RINGING message (step 506), and the SIP CANCEL message (step 524) would not be sent. The SIP RINGING message of step 508 would also occur after step 515. The remaining steps would occur in the same order.

FIGS. 4-5 disclose that the list of friendly names 210 is presented only once for a communication session. However, in other embodiments, the list of friendly names 210 may be presented again based on a flow of the communication session. For example, after the communication session is established in step 426, the user may elect to switch communication endpoints 101 in the communication session based on the user's address of record. The user will again be presented with the list of friendly names 210. The user can the select a different friendly name 211 to transfer the communication session of step 526. For example, the user is on their desktop phone and the user elects to transfer the call to the user's mobile device.

Alternatively, the user may elect to change the mode of the communication session of step 426/530. For example, the user may request to upgrade an audio communication session to a video communication session. Alternatively, the user may downgrade a video communication session to an audio communication session, switch an audio/video communication session to an instant messaging communication session, upgrade an instant messaging communication session to a voice or video communication session, and/or the like. The user may currently be on an audio only communication endpoint 101. In this example, the list of friendly names 210 may only show friendly names of communication endpoints 101 that support video.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An application server comprising: a microprocessor; and a non-transitory computer readable medium, coupled with the microprocessor and comprising microprocessor readable and executable instructions that cause the microprocessor to: determine a list of friendly names that identifies individual ones of a plurality of communication endpoints associated with a first address of record; generate for presentation, to a user, the list of friendly names; receive a selection of one of the friendly names in the list of friendly names; and send a message that results in a communication endpoint associated with the selected friendly name to: automatically initiate a new communication session; automatically switch between communication endpoints used in an existing communication session; or automatically answer a forked communication session.

2. The application server of claim 1, wherein the message indicates to automatically initiate the new communication session from the communication endpoint associated with the friendly name.

3. The application server of claim 1, wherein the message indicates to automatically answer the forked communication session with the communication endpoint associated with the friendly name.

4. The application server of claim 1, wherein the list of friendly names further comprises one or more additional names associated with a second address of record.

5. The application server of claim 1, wherein the executable instructions further comprise instructions to determine a type of the new or forked communication session and wherein the presented list of friendly names is a subset of the list of friendly names that is based on the type of the new or forked communication session.

6. The application server of claim 1, wherein the list of friendly names is presented a second time to the user based on a flow of the new or forked communication session.

7. The application server of claim 6, wherein the flow of the new or forked communication session comprises a call transfer or a media change and wherein the list of friendly names is a subset of the list of friendly names that is based on a media type of the call transfer or media change.

8. The application server of claim 1, wherein presenting the list of friendly names is based on an event captured by a communication application, wherein the event is one of a calendar event, a contact center event, closing a deal event, receiving a complaint event, receiving a product query event, or a communication endpoint switch event.

9. The application server of claim 1, wherein determining the list of friendly names is based on one of: receiving a plurality messages with individual friendly names; or receiving the list of friendly names.

10. The application server of claim 9, wherein the message indicates to automatically change the media type of the existing communication session.

11. A method comprising: determining, by a microprocessor, a list of friendly names that identifies individual ones of a plurality of communication endpoints associated with a first address of record; generating for presentation, by the microprocessor, to a user, the list of friendly names; receiving, by the microprocessor, a selection of one of the friendly names in the list of friendly names; and sending, by the microprocessor, a message that results in a communication endpoint associated with the selected friendly name to at least one of: automatically initiate a new communication session; automatically switch between communication endpoints used in an existing communication session; and automatically answer a forked communication session.

12. The method of claim 11, wherein the message indicates to automatically initiate the new communication session from the communication endpoint associated with the friendly name.

13. The method of claim 11, wherein the message indicates to automatically answer the forked communication session with the communication endpoint associated with the friendly name.

14. The method of claim 11, wherein the list of friendly names further comprises one or more additional names associated with a second address of record.

15. The method of claim 11, further comprising: determining, by the microprocessor, a type of the new or forked communication session and wherein the presented list of friendly names is a subset of the list of friendly names that is based on the type of the new or forked communication session.

16. The method of claim 11, wherein the list of friendly names is presented a second time to the user based on a flow of the new or forked communication session.

17. The method of claim 16, wherein the flow of the new or forked communication session comprises a call transfer or a media change and wherein the list of friendly names is a subset of the list of friendly names that is based on a media type of the call transfer or the media change.

18. The method of claim 11, wherein presenting the list of friendly names is based on an event captured by a communication application, wherein the event is one of a calendar event, a contact center event, closing a deal event, receiving a complaint event, receiving a product query event, or a communication endpoint switch event.

19. The method of claim 11, wherein determining the list of friendly names is based on one of: receiving a plurality messages with individual friendly names; or receiving the list of friendly names.

20. A communication server comprising: a microprocessor; and a non-transitory computer readable medium, coupled with the microprocessor and comprising microprocessor readable and executable instructions that cause the microprocessor to: send, to an application server, a list of friendly names that identifies individual ones of a plurality of communication endpoints associated with an address of record; receive, from the application server, an indication of a selection of one of the friendly names in the list of friendly names; and send a message, to a communication endpoint associated with the friendly name, wherein the message indicates for the communication endpoint associated with the friendly name to: automatically initiate a new communication session; automatically switch between communication endpoints used in an existing communication session; and/or automatically answer a forked communication session.

* * * * *